UNITED STATES PATENT OFFICE.

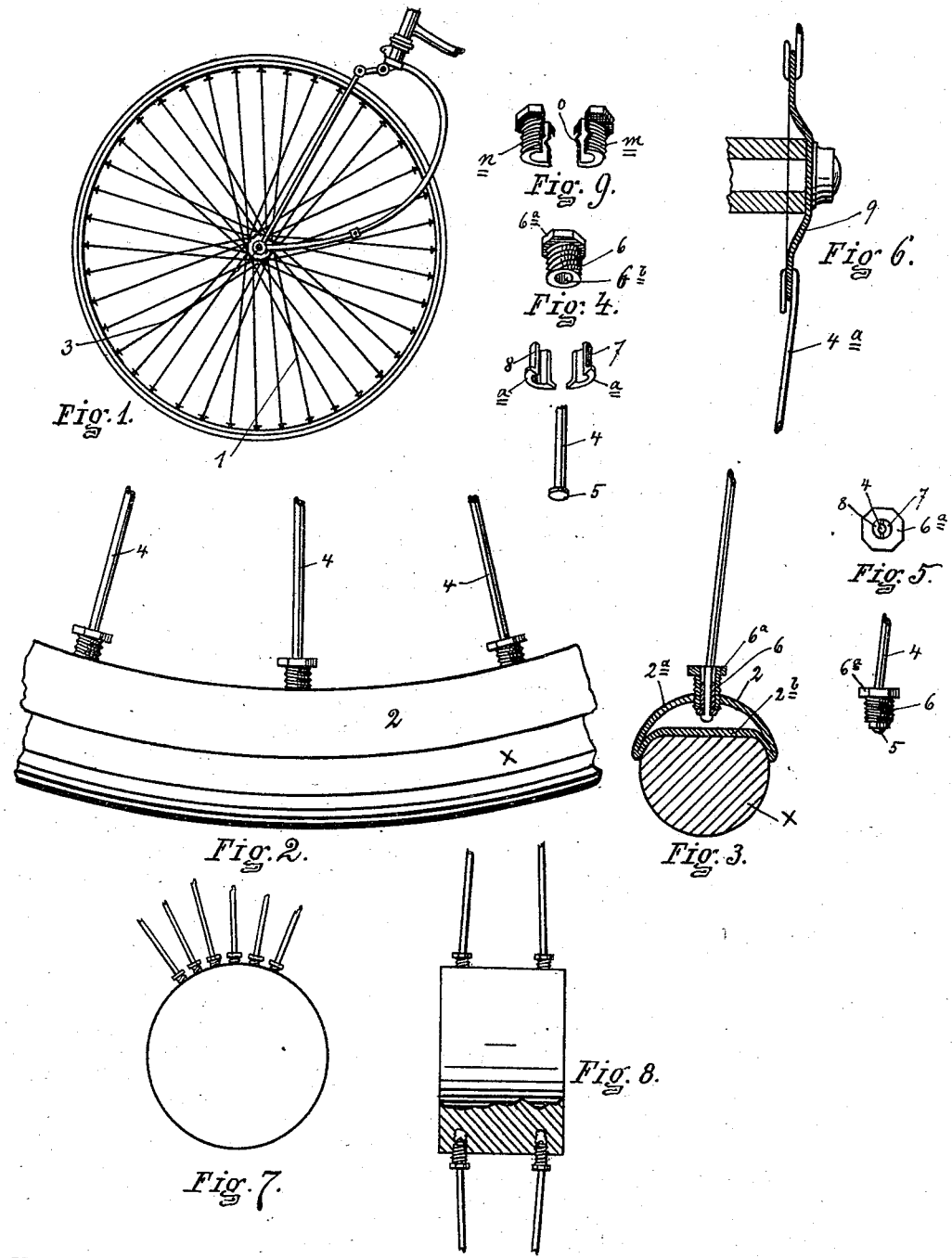

WILLIAM S. FOSTER, OF UTICA, NEW YORK, ASSIGNOR TO FOSTER BROS., OF SAME PLACE.

WHEEL.

SPECIFICATION forming part of Letters Patent No. 496,405, dated May 2, 1893.

Application filed May 31, 1892. Serial No. 434,937. (No model.)

*To all whom it may concern:*

Be it known that I, WILLIAM S. FOSTER, of Utica, in the county of Oneida and State of New York, have invented certain new and useful Improvements in Wheels; and I do hereby declare that the following is a full, clear, and exact description of the invention, which will enable others skilled in the art to which it appertains to make and use the same, reference being had to the accompanying drawings, and to the letters and numerals of reference marked thereon, which form part of this specification.

My invention relates to an improvement in wheels and wheels more particularly adapted for use in bicycles.

In the drawings which accompany and form a part of this specification and in which similar letters and numerals of reference refer to corresponding parts in the several views, Figure 1, shows a wheel having my improvement. Fig. 2, shows in enlarged detail a portion of the felly in connection with portions of three spokes and a securing device. Fig. 3 shows a cross section of the felly and tire and also a cross section of the spoke securing device in connection with a section of the spoke. Fig. 4, shows in separate details a screw threaded nipple, half bushing and a section of a head spoke such as is used in my wheel. Fig. 5 shows in side elevation and plan view, the parts shown in Fig. 4 when properly together for use. Fig. 6, shows a portion of the hub and a disk to which the inner ends of the spokes are attached in one of the constructions. Fig. 7, shows a modified form of hub and spoke attachment. In my adjustable spoke, an attaching or straining device is used at the hub end of the spoke. Fig. 8, shows the same parts shown in Fig. 7 from an edge view of the hub. Fig. 9 shows a modified form of nipple for attaining the same end.

Referring more particularly to the reference letters and numerals marked on the drawings, 1 indicates the wheel which is provided with a felly 2, and a hub 3, and spokes 4—4, &c. The tire is indicated by $x$. The spoke is provided on its end with a head 5.

6 is an externally screw threaded nipple, having a head $6^a$ adapted to receive a wrench and a central hole or opening $6^b$ of a size sufficient to permit a passage of the head 5.

7 and 8 are the duplicate halves of a separable bushing which have a flange $a$ at one end and when together leave an opening of a size adapted to receive the spoke 4, and closely surround it. The barrel of the bushing formed of the halves 7 and 8 is adapted to be received in the opening $6^b$ of the nipple 6.

The felly 2, is what is known as a hollow felly, that is having a shell $2^a$ on the inner surface of the felly and a shell $2^b$ on the tire surface of the felly leaving the space $c$ within the felly. The shell of the tire is perforated at suitable intervals in receiving the spokes 4, and the openings are tapped to receive the screw threaded nipple 6. The inner or hub ends of the spokes are preferably provided with a hook end as shown at $4^a$ adapted to hook into eyes provided on the disk 9 on the hub. With this construction of spoke fastening any spoke may be placed into or removed from the wheel without disturbing any of the other spokes.

To remove a spoke from the wheel, the nipple 6 is unscrewed until it becomes disengaged from the felly when it may be slid up the felly, and the piece of bushing 7 and 8 removed, after which the hub end of the spoke is unhooked and the spoke is removed. In placing a spoke in a wheel, the reverse of these operations is gone through.

The spokes may be independently adjusted or strained by turning the screw threaded nipple more or less into or out of the felly. In the construction shown in Figs. 7 and 8, the nipple 6, bushing and head end of the spoke may also be provided upon the hub end of the spoke. In such case the construction and operation are the same. In the construction shown in Fig. 9, the bushing pieces 7 and 8 are dispensed with and an opening through the nipple which is composed of pieces as $m$ and $n$ is made of a size to closely embrace the spoke. The pieces $m$ and $n$ are provided with a tooth as $o$ on one side and a corresponding depression on the other side to make the two pieces register with each other and they are held together when in use by being screwed into the screw threaded hole in the felly or hub as the case may be.

What I claim as new, and desire to secure by Letters Patent, is—

1. The combination in a wheel, of a felly and spoke having a head and screw threaded nipple adapted to be screwed into the felly and a bushing composed of two separable halves adapted to engage the spoke and being received within the opening of the nipple substantially as set forth.

2. The combination in a wheel of a felly and spoke having a head or a securing nipple screw threaded externally to engage a suitable screw-threaded opening in the felly, a bushing composed of separable pieces adapted to embrace the spoke and engage the head and be received within the opening in the nipple and having a flange for preventing the bushings passing through the opening of the nipple substantially as set forth.

3. The combination in a wheel of a felly and head spoke and separable pieces adapted to embrace the spoke and engage the head and be secured in a screw-threaded opening in the felly, substantially as set forth.

4. The combination of a hub or felly having a screw threaded opening and a spoke having a head, an externally screw threaded nipple having a head adapted to receive a wrench, an independent, removable, non-elastic bushing piece adapted to closely surround the spoke and engage the head and be received within the nipple, substantially as set forth.

5. The combination in a wheel of a felly, a spoke having a head on its felly end, an externally screw threaded nipple adapted to enter and screw into an opening in the inner side of the felly, an independent, removable, non-elastic bushing piece separable along at least one side to allow it to be placed upon the spoke and adapted to closely embrace the spoke and engage the head and be received within the nipple and secured thereby, substantially as set forth.

6. The combination in a wheel of a felly or hub having a screw threaded opening, a screw threaded nipple having a central opening, a spoke having a head adapted to pass through the opening in the nipple, and an independent, removable bushing having a sleeve portion adapted to fill the opening in the nipple around the spoke, and a shoulder to engage the nipple and being separable along one side at least to allow it to be placed upon the spoke or over the head thereof, substantially as set forth.

In witness whereof I have affixed my signature in presence of two witnesses.

WILLIAM S. FOSTER.

Witnesses:
RICH. A. GEORGE,
FREDK. C. INGALLS.